US007996572B2

(12) United States Patent
Blankenship et al.

(10) Patent No.: US 7,996,572 B2
(45) Date of Patent: Aug. 9, 2011

(54) MULTI-NODE CHIPSET LOCK FLOW WITH PEER-TO-PEER NON-POSTED I/O REQUESTS

(75) Inventors: Robert G. Blankenship, Tacoma, WA (US); Robert J. Greiner, Beaverton, WA (US); Herbert H. J. Hum, Portland, OR (US); Kenneth C. Creta, Gig Harbor, WA (US); Buderya S. Acharya, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 1240 days.

(21) Appl. No.: 10/859,891

(22) Filed: Jun. 2, 2004

(65) Prior Publication Data

US 2005/0273400 A1 Dec. 8, 2005

(51) Int. Cl.
*G06F 3/00* (2006.01)
*G06F 7/38* (2006.01)

(52) U.S. Cl. .............................................. 710/5; 712/22

(58) Field of Classification Search ....... 710/5; 712/220
See application file for complete search history.

(56) References Cited

U.S. PATENT DOCUMENTS

| 6,009,488 | A | 12/1999 | Kavipurapu | |
|---|---|---|---|---|
| 6,457,084 | B1 * | 9/2002 | Gulick et al. | 710/305 |
| 6,950,438 | B1 * | 9/2005 | Owen et al. | 370/409 |
| 2002/0103948 | A1 * | 8/2002 | Owen et al. | 710/33 |

* cited by examiner

*Primary Examiner* — Henry W Tsai
*Assistant Examiner* — Juanito C Borromeo
(74) *Attorney, Agent, or Firm* — Caven & Aghevli LLC

(57) ABSTRACT

Systems and methods of managing transactions provide for receiving a first flush command at a first I/O hub, wherein the first flush command is dedicated to non-posted transactions. One embodiment further provides for halting an inbound ordering queue of the first I/O hub with regard to non-posted transactions in response to the first flush command and flushing a non-posted transaction from an outgoing buffer of the first I/O hub to a second I/O hub while the inbound ordering queue is halted with regard to non-posted transactions.

30 Claims, 6 Drawing Sheets

MULTI-NODE CHIPSET LOCK FLOW WITH PEER-TO-PEER NON-POSTED I/O REQUESTS

CROSS-REFERENCE TO RELATED APPLICATIONS

The present application is related to U.S. application Ser. No. 09/751,623, filed on Dec. 29, 2000.

BACKGROUND

1. Technical Field

Embodiments of the present invention generally relate to systems and methods of accessing memory locations. More particularly, embodiments relate to systems and methods of performing locked reads in which peer-to-peer non-posted input/output (I/O) transactions are supported.

2. Discussion

In modern day computer systems, the ability to read, modify and write data in an uninterrupted sequence is often required in order to guarantee exclusive access to a given memory location, where the memory location is shared between multiple nodes (or agents) in the system. For example, such "atomic" accesses are often used for applications in which "locked" read/write sequences are needed for security purposes. Another example of the need for atomic accesses involves "hot-plugging", where a component such as a microprocessor is added to the system while the system is in operation. In such a case, certain uninterrupted configuration transactions must be made to multiple agents in order to provide for proper operation of the added component. The hot-plug lock flow therefore differs from the normal lock flow in that the normal lock flow involves accesses to a single agent. While conventional approaches to performing atomic accesses in multi-node systems have been effective in certain circumstances, there still remains considerable room for improvement.

FIG. 1 shows a conventional multi-node system 10 having a network interconnect 16, a plurality of processor nodes 12 (12a-12c) and a plurality of input/output (I/O) nodes with I/O hubs 14 (14a, 14b) coupled to the network interconnect 16. The I/O hubs 14 can be selected from the 870 chipset family available from Intel® in Santa Clara, Calif. The processor node 12a is coupled to a dynamic random access memory (DRAM) 18 and the I/O hubs 14 are coupled to I/O devices 20 (20a-20n), where the I/O devices have memory mapped I/O (MMIO) space 22 (22a-22n). Whenever a processor node 12 or I/O device 20 requires locked access to the DRAM 18 or the MMIO space 22, a locked read request is sent to a central lock arbiter 24. The locked read request is essentially a read request with a lock attribute to indicate that exclusive access is desired. If multiple locked read requests are received by the arbiter 24, the arbiter selects a winning request and subsequently retries losing requests.

In order to implement the locked read, the arbiter 24 "freezes" and flushes the outstanding transactions on the nodes in the system 10, then permits only the initiator of the read request and the target of the read to proceed until the atomic access is completed. The term "freeze" is used herein to refer to the process of halting a boundary (or port) of a network component so that a given transaction does not cross the boundary and remains where it is. Thus, the arbiter 24 broadcasts a processor flush command to the processor nodes 12, where each processor node 12 halts a front side bus (FSB) in response to the processor flush command. The processor nodes 12 then flush all outstanding transactions to the network interconnect 16. After the transactions have been flushed from a particular processor node, a flush completion message is sent to the arbiter 24. The arbiter 24 waits for all completions before proceeding to the next operation of the locked read.

When all of the processor node completions have been received, the arbiter 24 broadcasts an I/O hub (IOH) flush command 26 to the I/O hubs 14. The I/O hubs 14 have inbound ordering queues (IOQs), which are halted in response to the flush command 26. The IOQs are used to enforce I/O transaction ordering rules, which described in more detail below. The I/O hubs 14 then flush all outstanding transactions from their outgoing request buffers (ORBs), which hold information regarding requests that are pending in the network, to the network interconnect 16 and send a flush completion message to the arbiter 24. Although such an approach can be suitable for some purposes, a number of difficulties remain. A particular difficulty relates to transaction posting. Posting enables a device to proceed with the next operation while the posted transaction is still making its way through the network interconnect 16 to its ultimate destination. The use of unordered interconnects, however, can lead to multiple paths for data traveling from a source to a destination. Because some transactions, such as read requests, are heavily dependent on the order in which they are processed, certain read requests are designated as "non-posted" in order to ensure that they are not passed by a transaction that should be processed after the read request. The use of the non-posted designation in conjunction with well documented producer/consumer rules keeps the system from functioning in an unintended manner.

Unlike posted transactions, non-posted transactions have an explicit completion message that is returned from the destination to the source. FIG. 2 illustrates that in the case of a non-posted transaction between I/O hubs, the completion message can be trapped in the IOQ of the destination I/O hub and ultimately cause a deadlocked condition. Specifically, a first I/O hub 14a halts an IOQ 28 and a second I/O hub 14b halts an IOQ 30 in response to an IOH flush command. The first I/O hub 14a flushes the non-posted transaction "P2P RD A" from an outgoing request buffer (ORB) to the second I/O hub 14b by way of the network interconnect 16. The target I/O device 20c receives the non-posted transaction and returns a completion message "P2P Rd Comp A" to the second I/O hub 14b. Because the second I/O hub 14b has halted the IOQ 30, however, the completion message is trapped in the IOQ 30 and is never received by the first I/O hub 14a. Accordingly, the first I/O hub 14a is not able to return the completion message necessary for the arbiter 24 (FIG. 1) to proceed with the locked read. Due to such a potential for a deadlocked condition, conventional architectures do not permit peer-to-peer non-posted I/O transactions.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
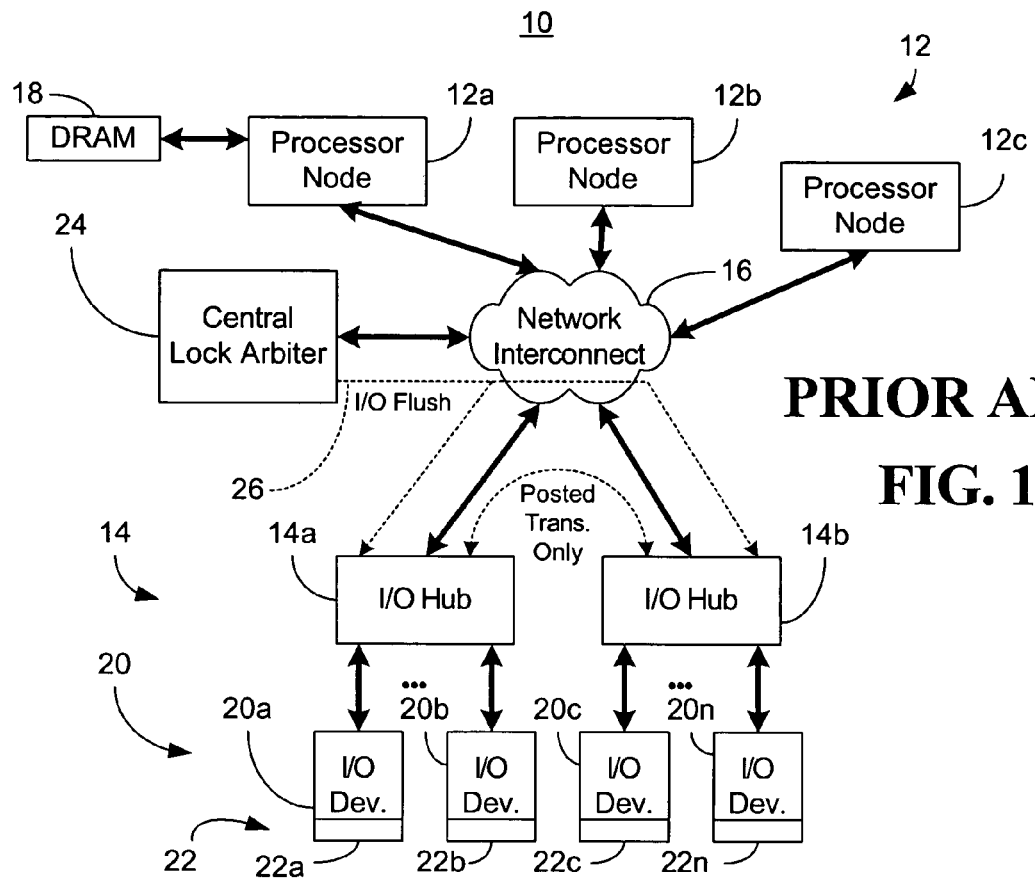
FIG. 1 is a block diagram of an example of a conventional multi-node system.
Figure 3:
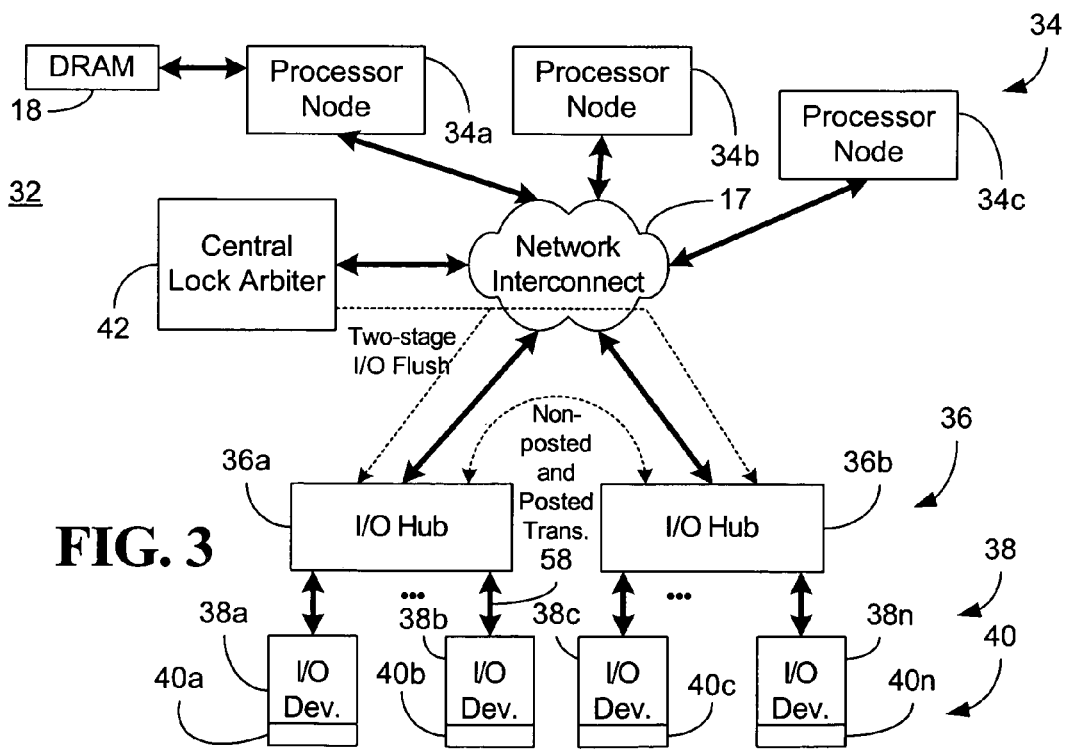
FIG. 3 is a block diagram of an example of a multi-node system according to one embodiment of the invention.
Figure 2:
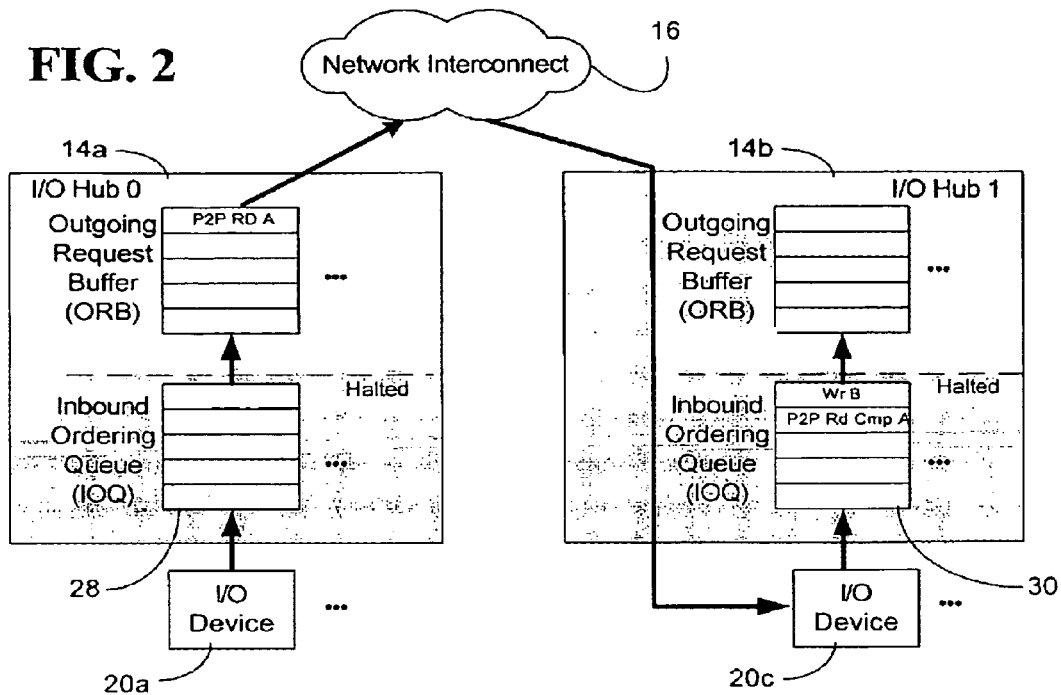
FIG. 2 is a block diagram of an example of a plurality of deadlocked I/O nodes.

FIG. 3 shows a multi-node system 32 having a network interconnect 17, a plurality of processor nodes 34 (34a-34c) and a plurality of input/output (I/O) nodes with I/O hubs 36 (36a, 36b) and I/O devices 38 (38a-38n). The illustrated processor node 34a is coupled to a dynamic random access memory (DRAM) and the I/O devices 38a include memory mapped I/O (MMIO) space 40 (40a-40n). The system 32 also has a central lock arbiter 42, which can manage the freezing/flushing and thawing of the network as needed. In particular, the arbiter 42 is able to implement a two-stage I/O flush in which the first stage involves issuing a flush command that is dedicated to non-posted transactions.

Figure 4:
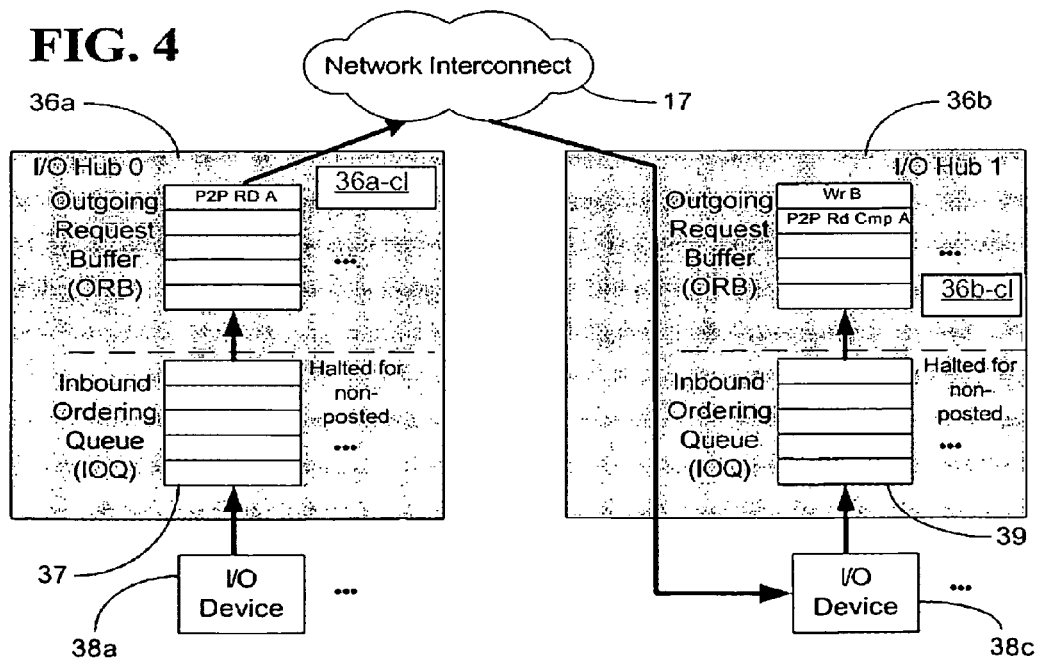
FIG. 4 is a block diagram of an example of a plurality of I/O nodes according to one embodiment of the invention.

FIG. 4 shows a pair of I/O hubs in which a flush command that is dedicated to non-posted transactions enables the deadlocking condition associated with conventional approaches to be avoided. While the illustrated embodiment shows two I/O hubs 36a and 36b for ease of discussion, the principles described herein can be readily scaled to all I/O hubs in the system. The I/O hubs 36a and 36b have control logic (logics 36a-c1 and 36b-c1) to respond to such a flush command and eliminate the risk of a deadlocking condition. In particular, in response to the specialized flush command, a first I/O hub 36a halts an IOQ 37 only with regard to non-posted transactions and a second I/O hub 36b halts an IOQ 39 only with regard to non-posted transactions. The first I/O hub 36a flushes the non-posted transaction "P2P RD A" from an outgoing request buffer (ORB) to the second I/O hub 36b by way of the network interconnect 17.

The target I/O device 38c receives the non-posted transaction and returns a completion message "P2P Rd Cmp A" to the second I/O hub 36b. Because the second I/O hub 36 has halted the IOQ 39 only with regard to non-posted transactions, the completion message passes through the IOQ 39, the ORB of the second I/O hub and back to the first I/O hub 36a. The first I/O hub 36a is therefore able to return the completion message necessary for the arbitrator 42 (FIG. 3) to proceed. Accordingly, the conventional deadlocked condition is avoided and the illustrated architecture permits peer-to-peer non-posted I/O transactions. It should be noted that only a single IOQ/ORB pair for the I/O hubs 36a and 36b is shown for ease of discussion. In practice, each I/O hub may have an array of IOQs and an array of ORBs, where each IOQ and each ORB corresponds to an I/O bus connection to an I/O device.

Figure 5:
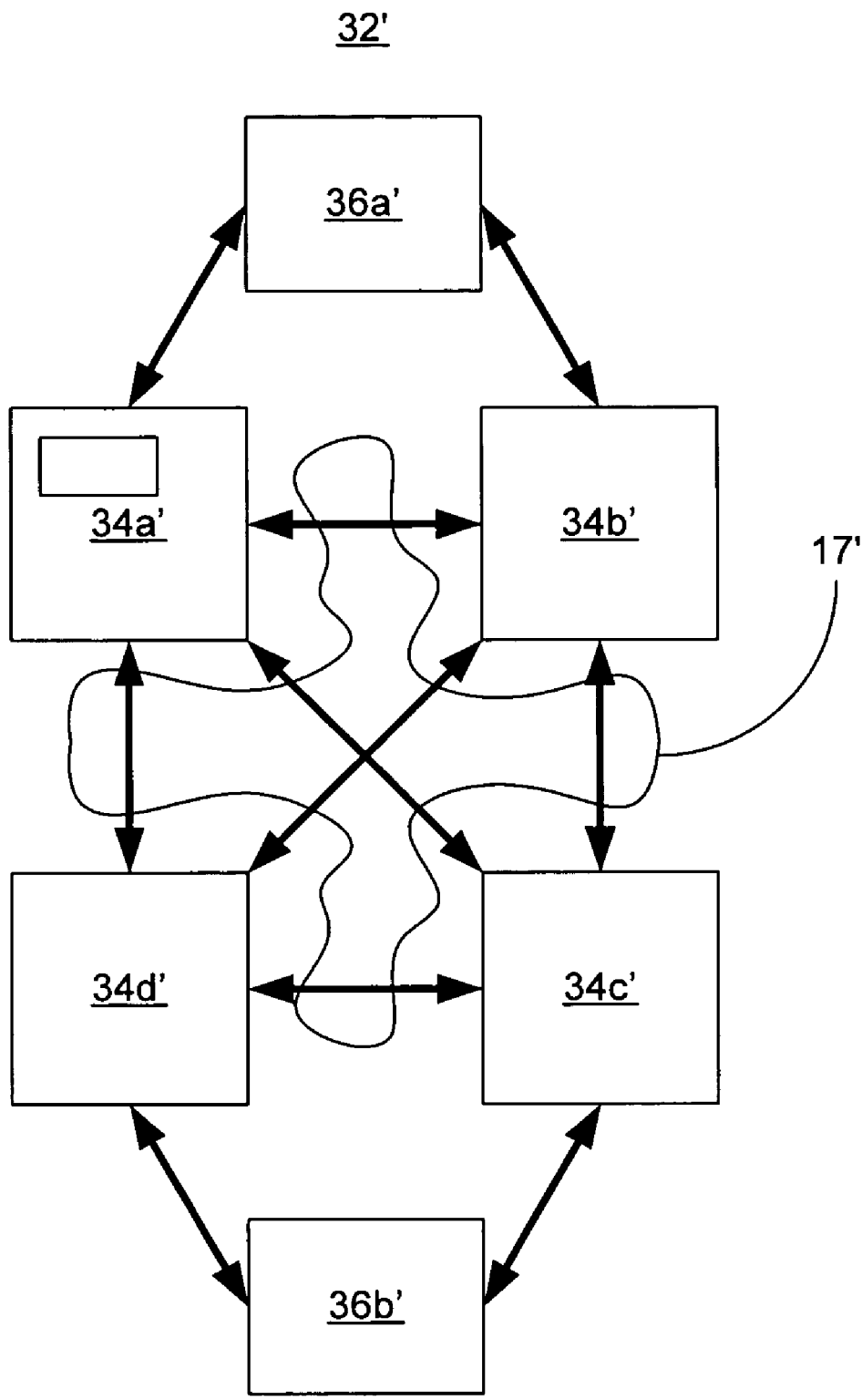
FIG. 5 is a block diagram of an example of a network interconnect according to one embodiment of the invention.

Turning now to FIG. 5, one example of a network interconnect 17' is shown in greater detail. The illustrated network interconnect 17' represents a point-to-point fabric, which interconnects the nodes in the computer system 32'. In the illustrated embodiment, the point-to-point network interconnect 17' is coupled to processor nodes 34a'-34d', where the central lock arbiter 42' is incorporated into the processor node 34a'. In the point-to-point fabric topology, each processor node has a direct link to other processor nodes in the system. The network interconnect 17' can also have a layered communication protocol in which peer-to-peer I/O requests are transferred between nodes in packets at a protocol layer. Packets are data structures having a header and payload; where, the header includes "routing information" such as the source address and/or destination address of the packet; and/or, a connection identifier that identifies a connection that effectively exists in the network interconnect 17' to transport the packet. Other layers such as transport, routing, link and physical layers can reside beneath the protocol layer in the hierarchy. Table I summarizes one approach to implementing the layered communication protocol.

TABLE I

| Layer | Description |
| --- | --- |
| Protocol | Higher level communication protocol between nodes such as power management, cache coherence, ordering, peer-to-peer I/O, interrupt delivery, etc. |
| Transport | End-to-end reliable transmission between two agents |
| Routing | Flexible and distributed way to route packets from a source to a destination |
| Link | Reliable data transfer and flow control between two directly connected agents & virtualization of the physical channel |
| Physical | Electrical transfer of information between two directly connected agents. |

The transport and routing layers may be needed for certain platform options only. In desktop/mobile and dual processor systems, for example, the functionality of the routing layer can be embedded in the link layer. Simply put, layers may be added or removed from the protocol without parting from the spirit and scope of the illustrated embodiments. Furthermore, other topologies such as ring and/or bus topologies can be used depending upon scalability and other implementation concerns.

Figure 6A:
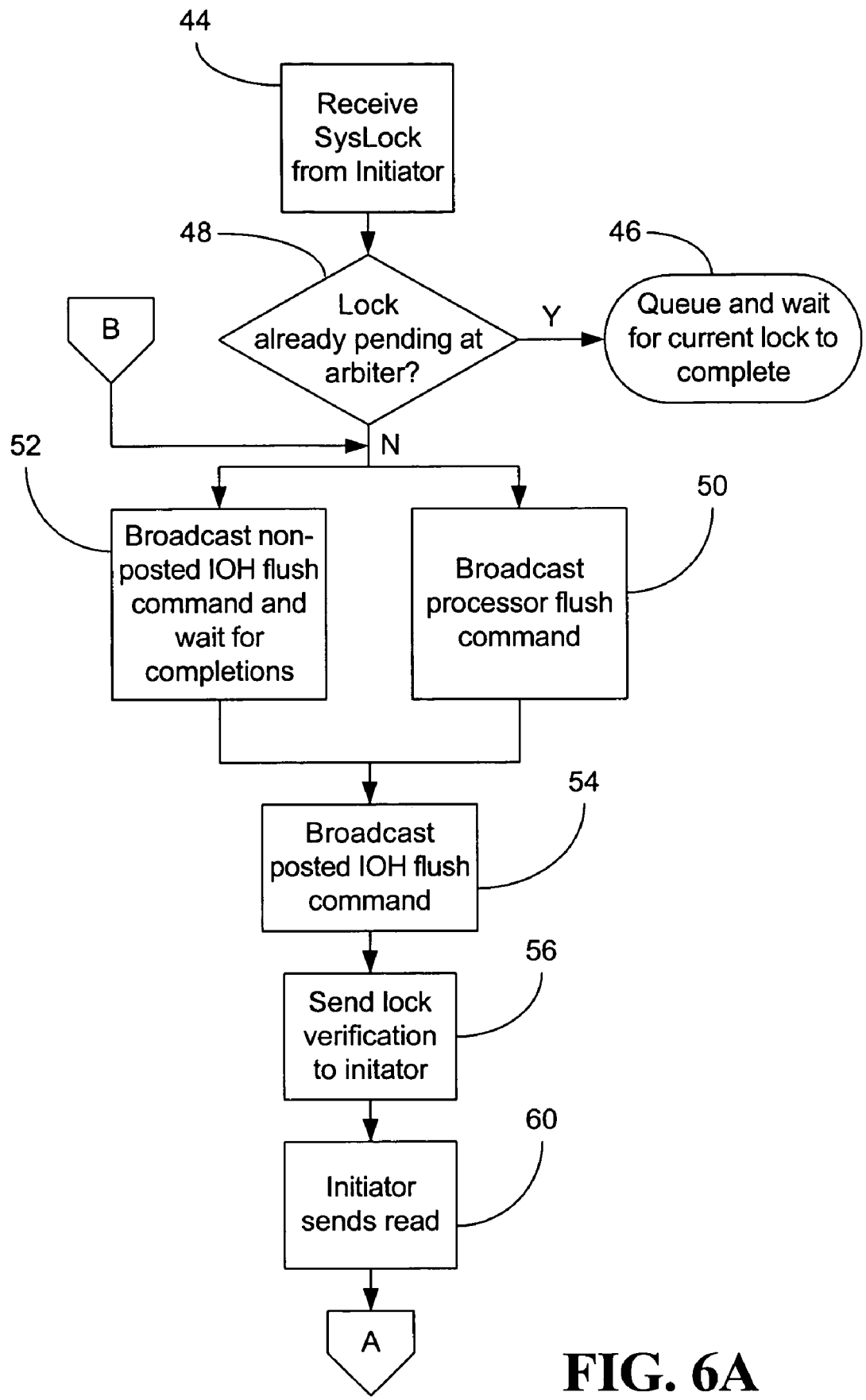
FIGS. 6A and 6B are a flowchart of an example of a method of arbitrating locked reads according to one embodiment of the invention.
Figure 6B:
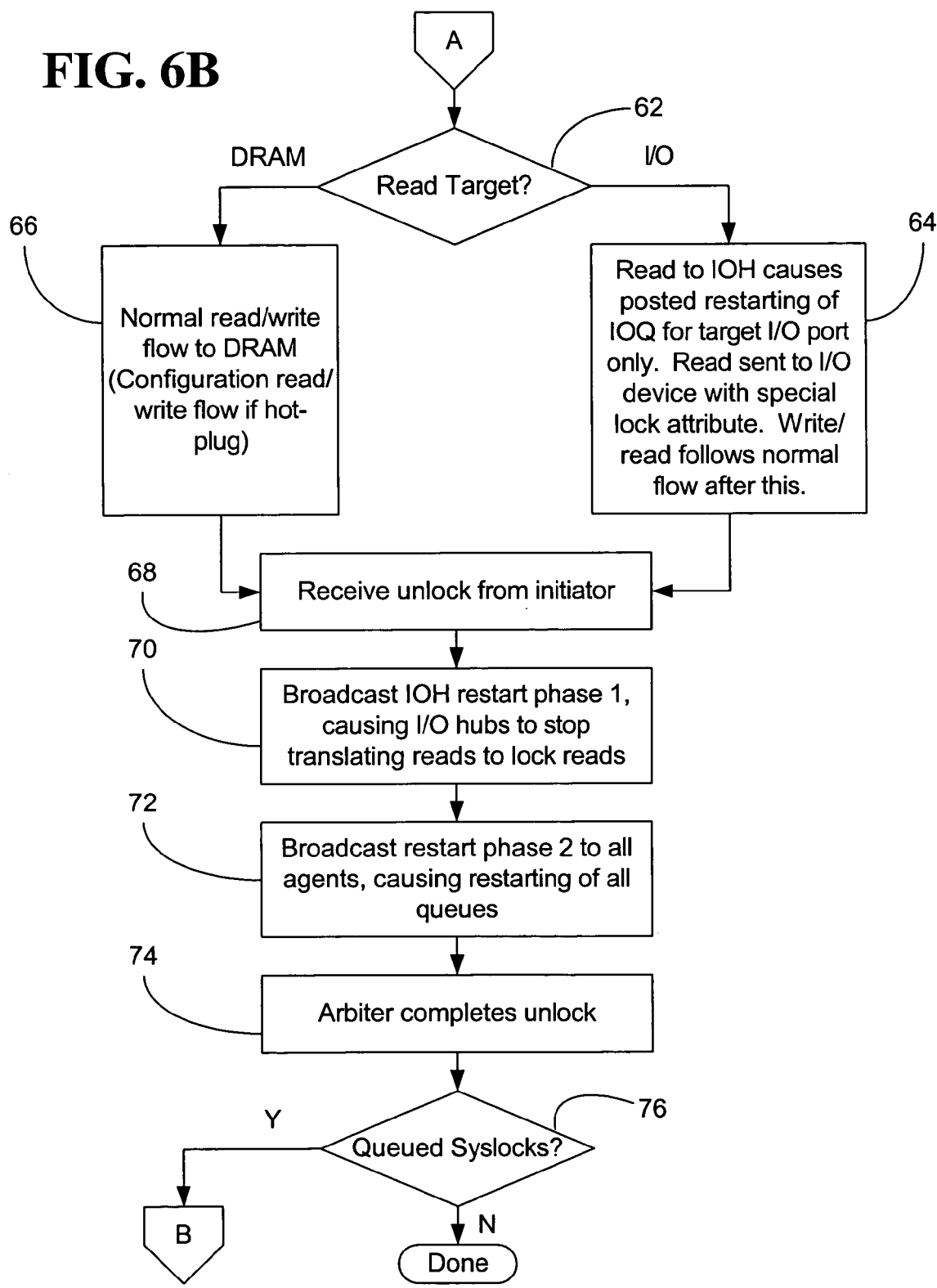

Turning now to FIG. 6A, one approach to performing locked reads is shown. FIGS. 6A and 6B can be implemented in a central lock arbiter using any commercially available hardware and/or software programming technique. Processing block 44 provides for receiving a lock request at a central lock arbiter. In the illustrated example, the lock request is termed "SysLock" and is received from an initiator, which may be one of the system nodes. The lock request can also be associated with a hot-plug event in which a component such as a microprocessor has been added to the system while the system is in operation. In either case, locked atomic access to a memory location may be desired. If a lock is already pending at the arbiter, the received lock request is queued at block 46. It should be noted that such an technique does not require the retry and anti-starvation logic associated with conventional approaches. The result is a substantially simpler design, faster validation and reduced cost.

Also, the lock request received at block 44 need not contain an address (unlike conventional locked read requests) because the initiator of the lock request is given the responsibility of subsequently issuing the read request. The read request issued by the initiator, however, includes an address to the target location. Each lock request can be either received without an address or the arbiter can remove the address from the lock request before queuing the lock request. By permitting the lock requests to lack an address, the size of the lock request queue can be reduced.

If it is determined at block 48 that next-in-line lock request is ready to proceed, the illustrated method provides for issuing a processor flush command at block 50 in parallel with a first I/O hub (IOH) flush command at block 52. Issuing the processor flush command at block 50 causes the processors to implement an internal freeze. The precise location of the freeze can vary, but it is done so that each processor can unconditionally accept snoops, which ensure coherency between memory structures. The first IOH flush command at block 52 is dedicated to non-posted transactions and represents the first stage of the two-stage I/O flush. Directing the I/O hubs to freeze and flush with respect to non-posted transactions only, enables the completion messages associated with the flushed non-posted transactions to avoid being trapped as would occur in conventional approaches. As a result, the illustrated method provides for full peer-to-peer I/O communication. In addition, implementing processing blocks 50 and 52 in parallel saves a considerable amount of time and effectively makes the two-stage IOH flush transparent in comparison to the conventional approach.

When all completion messages have been received, the arbiter issues a second IOH flush command at block 54, where the second IOH flush command can be directed to posted transactions as well as non-posted transactions. Block 56 provides for sending a lock verification to the initiator of the lock request and the initiator sends the read request to the target location at block 60. In the example illustrated in the decision block 62 of FIG. 6B, the target is either, DRAM, MMIO or hot-plug configuration space of the nodes. In the case of a hot-plug configuration, the initiator may target many different agents while under the lock control. Such atomic access may be necessary for the addition or removal of an agent.

With continuing reference to FIGS. 3 and 6B, the initiator could be the processor node 34c, where the processor node 34c is attempting to gain atomic access to the DRAM 18. In such a case, the processor node 34c can send the read request to the processor 34a, where the read request includes an address to a location in the DRAM 18. Alternatively, the processor node 34c could be attempting to gain atomic access to the MMIO space 40b of the I/O device 38b, where the I/O device 38b is coupled to the I/O hub 36a by an I/O bus 58. The target I/O bus 58 could be implemented in any type of commercially available bus such as Peripheral Component Interconnect (PCI) Express (e.g., PCI Express Base Specification 1.0a), PCI-X (e.g., PCI-X Protocol Specification 2.0a), PCI (e.g., Conventional PCI 2.2), and so on. In any event, the read request could be addressed to the MMIO space 40b and directed to the I/O hub 36a. In yet another example, the processor node 34c could be a newly added node attempting to gain atomic access to the hot-plug configuration space of each of processor nodes 34a, 34b and I/O devices 38.

If the read request is an I/O read, then the read causes the IOQ associated with the target I/O bus to be restarted (i.e., "thawed") with regard to posted transactions at processing block 64. The read request is translated into a locked read request so that the target device is notified that a locked read is taking place. Subsequent writes and/or reads are forwarded to the target I/O bus associated with the read request. If the read request is directed to DRAM, then block 66 provides for reads and/or writes to the appropriate DRAM location and no translation is required. In the case of a hot-plug event, the reads and writes are typically configuration reads and writes that target multiple nodes.

Block 68 provides for receiving an unlock request from the initiator of the lock request and block 70 provides for issuing a command to the I/O hub nodes, where the command instructs the I/O hubs to discontinue translation of read requests into locked read requests. An unlock command is issued to the nodes at block 72, where the unlock command instructs the processors to reverse their internal freezes and instructs the I/O hubs to restart their inbound ordering queues with regard to posted and non-posted transactions. Block 74 provides for completing the unlock procedure and block 76 provides for determining whether there are any lock requests remaining in the lock request queue. If so, the process flow returns to the parallel issuance of processor and IOH flush commands already discussed.

Figure 7:
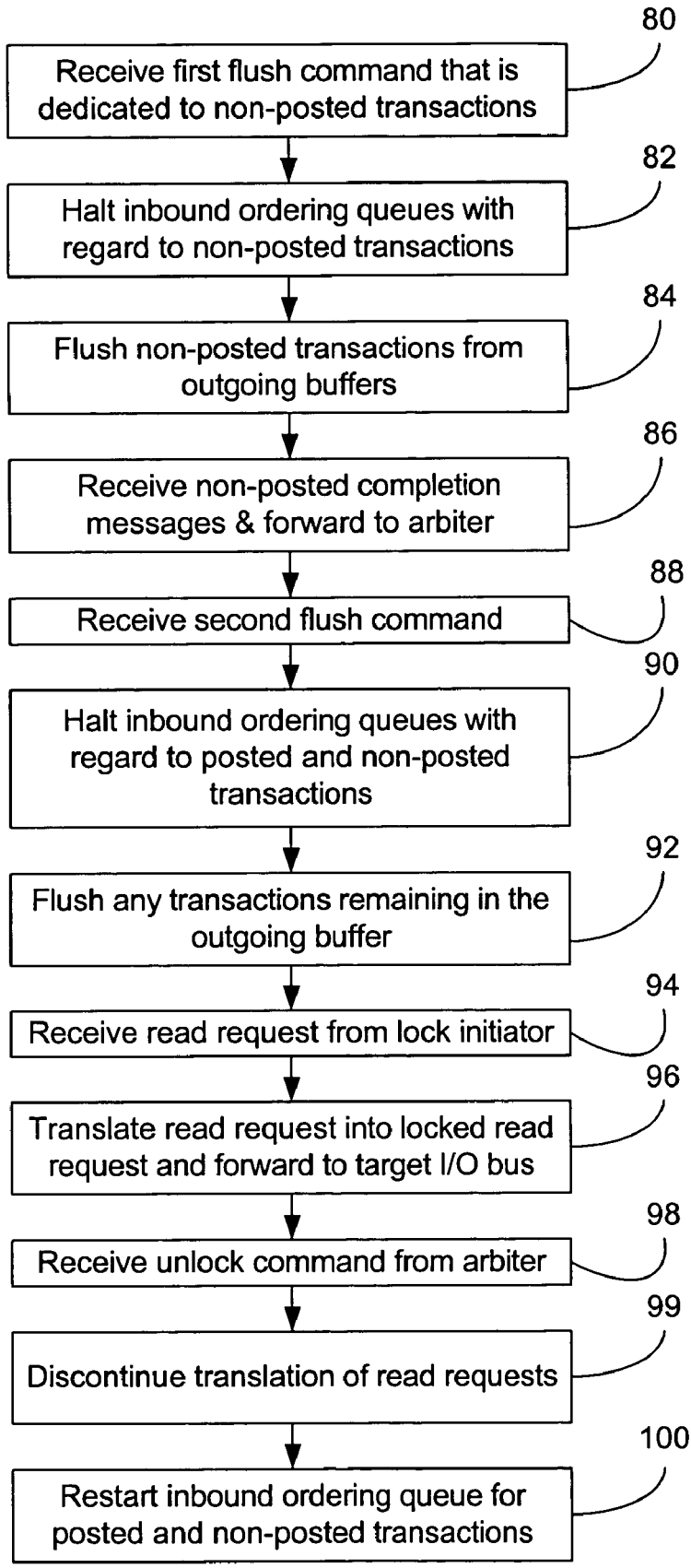
FIG. 7 is a flowchart of an example of a method of managing transactions according to one embodiment of the invention.

Turning now to FIG. 7, a method of managing IOH transactions is shown at 78. The method 78 can be implemented in control logic of each of the I/O hubs in a multi-node system using any commercially available hardware and/or software programming technique. In particular, processing block 80 provides for receiving a first flush command at a first I/O hub, where the first flush command is dedicated to non-posted transactions. One or more inbound ordering queues of the first I/O hub are halted at block 82 with regard to non-posted transactions in response to the first flush command. Block 84 provides for flushing one or more non-posted transactions from the outgoing buffers of the first I/O hub to a second I/O hub while the inbound ordering queues are halted with regard to non-posted transactions. Completion messages are received from the second I/O hub for the flushed non-posted transactions and at least one of the completion messages is forwarded to the originator of the first flush command (e.g., the arbiter) at block 86.

Block 88 provides for receiving a second flush command from the originator of the first flush command and block 90 provides for halting the inbound ordering queue of the first I/O hub with regard to posted transactions as well as non-posted transactions in response to the second flush command. Any transactions remaining in the outgoing buffer of the first I/O hub are flushed at block 92 while the inbound ordering queue is halted with regard to posted transactions. Block 94 provides for receiving a read request from an initiator of the lock request. The initiator could be processor node, an I/O node, a hot-plug controller, and so on.

The read request is translated into a locked read request at block 96, and in one approach the read request lacks a lock attribute, where the translating includes adding the lock attribute to the read request. Block 96 can also provide for restarting a target inbound ordering queue with regard to posted transactions, where the target inbound ordering queue is associated with the target I/O bus. An unlock command is received from the originator of the flush commands (e.g., the lock arbiter) at block 98 and the read request translation is discontinued at block 99. The inbound ordering queues are restarted with regard to posted and non-posted transactions at block 100. It should be noted that read request translation may be discontinued before restarting the inbound ordering queues in order to protect against transactions being improperly translated into locked transactions.

Thus, a number of advantages can be achieved through the principles described herein. For example, enabling peer-to-peer non-posted I/O traffic substantially increases the functionality and desirability of the overall system. Furthermore, queuing lock requests allows the elimination of relatively complex retry and anti-starvation logic for the central lock arbiter. The result is easier verification in pre- and post-silicon stages of development. In addition, permitting lock requests to lack an address allows a significant reduction in the size of the lock request queue (particularly in systems with a relatively large number of nodes). Issuing lock requests that lack an address provides additional validation savings and overall simplification. Yet another advantage is the time savings associated with the parallel broadcasting of processor and I/O flush commands. Other advantages can also be achieved.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method comprising:
generating a first flush command that is dedicated to non-posted transactions and not to any posted transactions; and
receiving the first flush command at a first I/O hub,
wherein one or more read requests are to be designated as non-posted transactions to ensure that the one or more read requests are not passed in processing order by a transaction that should be processed after the one or more read requests; and
wherein a flush command is to be broadcasted for posted transactions only after broadcasting the first flush command for non-posted transactions and receiving all completions messages to be sent in response to the broadcasting the first flush command.

2. The method of claim 1, further including:
halting an inbound ordering queue of the first I/O hub with regard to only non-posted transactions in response to the first flush command; and
flushing a non-posted transaction from an outgoing buffer of the first I/O hub to a second I/O hub while the inbound ordering queue is halted with regard to only non-posted transactions.

3. The method of claim 2, further including:
receiving a completion message from the second I/O hub for the flushed non-posted transaction;
forwarding the completion message to an originator of the first flush command.

4. The method of claim 3, further including:
receiving a second flush command from the originator of the first flush command;
halting the inbound ordering queue of the first I/O hub with regard to posted transactions in response to the second flush command; and
flushing any transactions remaining in the outgoing buffer of the first I/O hub while the inbound ordering queue is halted with regard to posted transactions.

5. The method of claim 4, wherein the originator of the flush commands is a lock arbiter, the lock arbiter receiving a lock request, queuing the lock request and generating the flush commands in response to the lock request, the lock request lacking an address.

6. The method of claim 5, wherein the lock request is associated with a hot-plug event.

7. The method of claim 4, further including:
receiving a read request;
translating the read request into a locked read request; and
forwarding the read request to a target I/O bus associated with the locked read request.

8. The method of claim 7, wherein receiving the read request includes receiving the read request from either a processor node or an I/O node of a computer system.

9. The method of claim 7, wherein the read request lacks a lock attribute and the translating includes adding the lock attribute to the read request.

10. The method of claim 7, wherein forwarding the read request includes restarting a target inbound ordering queue with regard to posted transactions, the target inbound ordering queue being associated with the target I/O bus.

11. The method of claim 7, further including:
receiving an unlock command from the originator of the flush commands;
discontinuing the translating; and
restarting the inbound ordering queue with regard to posted and non-posted transactions after discontinuing the translating.

12. The method of claim 4, wherein halting the inbound ordering queue includes halting an array of inbound ordering queues, each inbound ordering queue corresponding to an I/O bus, and wherein flushing the outbound buffer includes flushing an array of outbound buffers, each outbound buffer corresponding to an I/O bus.

13. An apparatus comprising:
generating logic to generate a first flush command that is dedicated to non-posted transactions and not to any posted transactions; and
control logic to receive the first flush command at a first I/O hub,
wherein one or more read requests are to be designated as non-posted transactions to ensure that the one or more read requests are not passed in processing order by a transaction that should be processed after the one or more read requests; and
wherein a flush command is to be broadcasted for posted transactions only after broadcasting the first flush command for non-posted transactions and receiving all completions messages to be sent in response to the broadcasting the first flush command.

14. The apparatus of claim 13, further including:
an inbound ordering queue, the control logic to halt the inbound ordering queue with regard to only non-posted transactions in response to the first flush command; and
an outgoing buffer, the control logic to flush a non-posted transaction from the outgoing buffer to a second I/O hub while the inbound ordering queue is halted with regard to only non-posted transactions.

15. The apparatus of claim 14, wherein the control logic is to receive a completion message from the second I/O hub for the flushed non-posted transaction and forward the completion message to an originator of the first flush command.

16. The apparatus of claim 15, wherein the control logic is to receive a second flush command from the originator of the first flush command, halt the inbound ordering queue with regard to posted transactions in response to the second flush command and flush any transactions remaining in the outgoing buffer while the inbound ordering queue is halted with regard to posted transactions.

17. The apparatus of claim 16, wherein the originator of the flush commands is to be a lock arbiter, the lock arbiter to generate the flush commands in response to a lock request, the lock request to lack an address.

18. The apparatus of claim 16, wherein the control logic is to receive a read request, translate the read request into a locked read request and forward the read request to a target I/O bus associated with the locked read request.

19. The apparatus of claim 18, wherein the control logic is to receive the read request from either a processor node or an I/O node of a computer system.

20. The apparatus of claim 18, wherein the read request is to lack a lock attribute and the translating is to include adding the lock attribute to the read request.

21. The apparatus of claim 18, wherein the control logic is to restart a target inbound ordering queue with regard to posted transactions, the target inbound ordering queue to be associated with the target I/O bus.

22. The apparatus of claim 18, wherein the control logic is to receive an unlock command from the originator of the flush commands, and restart the inbound ordering queue with regard to posted and non-posted transactions.

23. The apparatus of claim 16, further including:
an array of inbound ordering queues, each inbound ordering queue to correspond to an I/O bus; and
an array of outbound buffers, each outbound buffer to correspond to an I/O bus, the control logic to halt the array of outbound buffers and flush the array of outbound buffers.

24. A system comprising:
generating logic to generate a first flush command that is dedicated to non-posted transactions and not to any posted transactions;
a lock arbiter to issue the first flush command;
a network interconnect coupled to the lock arbiter, the network interconnect having a layered protocol to act as a point-to-point link; and
a first input/output (I/O) hub coupled to the network interconnect, the first I/O hub to receive the first flush command over the network interconnect,
wherein one or more read requests are to be designated as non-posted transactions to ensure that the one or more read requests are not passed in processing order by a transaction that should be processed after the one or more read requests; and
wherein a flush command is to be broadcasted for posted transactions only after broadcasting the first flush command for non-posted transactions and receiving all completions messages to be sent in response to the broadcasting the first flush command.

25. The system of claim 24, further including a second I/O hub coupled to the network interconnect, the first I/O hub including an inbound ordering queue and an outgoing buffer, the first I/O hub to halt the inbound ordering queue with regard to only non-posted transactions in response to the first flush command and flush a non-posted transaction from the outgoing buffer to the second I/O hub while the inbound ordering queue is halted with regard to only non-posted transactions.

26. The system of claim 25, wherein the first I/O hub is to receive a completion message from the second I/O hub for the flushed non-posted transaction and forward the completion message to the lock arbiter.

27. The system of claim 26, wherein the lock arbiter is to issue a second flush command, the first I/O hub to receive the second flush command over the network interconnect, halt the inbound ordering queue with regard to posted transactions and flush any transactions remaining in the outgoing buffer while the inbound ordering queue is halted with regard to posted transactions.

28. The system of claim 24, wherein the lock arbiter is to issue a processor flush command in parallel with the first flush command.

29. The method of claim 1, further comprising broadcasting the first flush command to a plurality of I/O hubs.

30. The method of claim 1, further comprising broadcasting a processor flush command to a plurality of processors in response to the first flush command.

* * * * *